United States Patent [19]

Sugiura et al.

[11] Patent Number: 5,769,386
[45] Date of Patent: Jun. 23, 1998

[54] ELECTROMAGNETIC PROPORTIONAL PRESSURE CONTROL VALVE

[75] Inventors: Hiroaki Sugiura, Hachioji; Hideki Nakayoshi, Kariya, both of Japan

[73] Assignee: Aisin Seiki Kabushiki Kaisha, Kariya, Japan

[21] Appl. No.: 668,945

[22] Filed: Jun. 24, 1996

[30] Foreign Application Priority Data

Jun. 22, 1995 [JP] Japan ................................. 7-156325

[51] Int. Cl.⁶ .................................................. F16K 31/12
[52] U.S. Cl. .......................... 251/37; 251/30.04; 251/33
[58] Field of Search ............................ 251/30.03, 30.02, 251/37, 38, 36, 30.04, 33; 303/119.2

[56] References Cited

U.S. PATENT DOCUMENTS 4,679,765   7/1987   Kramer et al. .............................. 251/38
5,564,673   10/1996  Pieren ...................................... 251/37 X Primary Examiner—Kevin Lee
Attorney, Agent, or Firm—Hazel & Thomas, P.C.

[57] ABSTRACT

An electromagnetic proportional pressure control valve includes a housing having at least one fluid inlet port and fluid outlet port and a passage for communicating between the ports. A spool is slidably accommodated in the housing for opening and closing the passage between both the ports. A plunger device is housed in the housing to define a pressure chamber, and includes a pilot valve. A return passage is arranged through the plunger device between the pressure chamber and the outlet port. The opening and closing of the return passage is controlled by the pilot valve. A restricting device restricts a fluid communicating between the inlet port and the pressure chamber. An electromagnetic device has an electromagnetic coil and a core of magnetic material to generate electromagnetic force for allowing the pilot valve to move so as to control the opening and closing of the return passage. Lastly, the pressure control includes a device for preventing the pilot valve from moving as a result of fluctuations in the fluid pressure in the pressure chamber regardless of the electromagnetic force generated by the electromagnetic device.

3 Claims, 2 Drawing Sheets

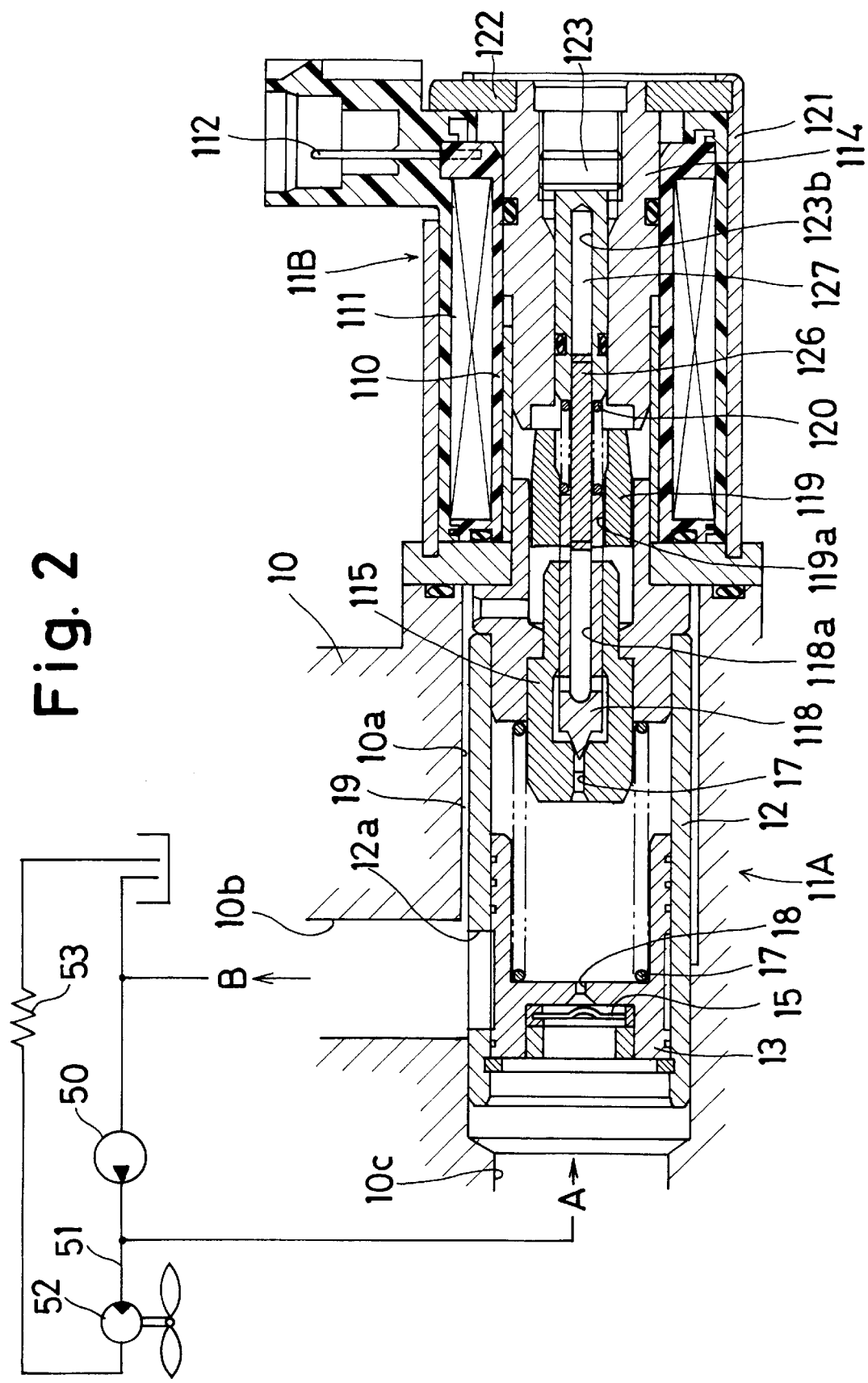

ELECTROMAGNETIC PROPORTIONAL PRESSURE CONTROL VALVE

CROSS REFERENCE TO RELATED APPLICATIONS

This application is related to U.S. patent application Ser. No. 08/347,067, filed on Nov. 23, 1994, currently pending.

BACKGROUND OF THE INVENTION

1. Field of the Invention

The present invention relates to an electromagnetic proportional pressure control valve, and more particularly to an electromagnetic proportional pressure control valve having a slidable spool that descends on the magnitude of fluid pressure in a pressure chamber for opening and closing a passage between inlet and outlet ports of the pressure control valve.

2. Description of the Prior Art

Electromagnetic proportional pressure control valves are used in various fields of automotive vehicles. One example of an application for this type of valve can be found in an engine cooling system wherein an oil pump is operated by such a valve and is disclosed in the Japanese Patent Publication (KOKOKU) No. 5(1993)-73955. This prior pressure control valve includes inlet and outlet ports which are formed on a housing, a passage allowing an oil to flow from the inlet port to the outlet port, a control valve for cutting off and establishing the fluid communication between the ports, and an electromagnetically driven pilot valve to regulate the oil pressure in a first pressure chamber inside the control valve so as to displace the control valve in response to variations in the water temperature in a radiator. The control valve is formed as a frustum of a cone and will be subjected to fluctuating forces due to sudden changes in a pressure receiving area on the control valve when energization and disenergization are repeated at a high frequency rate.

In order to diminish the "hunting" of the control valve due to such fluctuating forces produced in the electromagnetic proportional pressure control valve, the prior pressure control valve is provided with a second pressure chamber that normally communicates with the first pressure chamber through a spill passage having a predetermined flow resistance.

In the prior pressure control valve, however, since the spill passage has a predetermined flow resistance, the damping effect is reduced due to an incremental leaking of oil through the spill passage when the oil temperature is raised and the viscosity of oil becomes lower. Therefore, it is not able to obtain a proper dumping effect exclusive of certain conditions under which the oil temperature is in a predetermined condition. Furthermore, when the oil temperature is in a low condition and the viscosity of oil is higher, it becomes harder for oil to escape from the second pressure chamber. As a result, the response time for opening the control valve after the opening of the pilot valve becomes slower.

SUMMARY OF INVENTION

It is, therefore, an object of the present invention to provide an improved electromagnetic proportional pressure control valve which overcomes the above drawbacks.

It is another object of the present invention to provide an improved electromagnetic proportional pressure control valve which can diminish the "hunting" action of the control valve.

In order to achieve these objectives, there is provided an electromagnetic proportional pressure control valve which includes a housing having at least one fluid inlet port and fluid outlet port and a passage for communicating between the ports, a spool slidably accommodated in the housing for opening and closing the passage between both the ports, plunger means housed in the housing to define a pressure chamber and having a pilot valve, return passage means arranged through the plunger means between the pressure chamber and the outlet port whose opening and closing is controlled by the pilot valve, restricting means for restricting a fluid communicating between the inlet port and the pressure chamber, electromagnetic means having an electromagnetic coil with a core of magnetic material to generate electromagnetic force for allowing the pilot valve to move so as to control the opening and closing of the return passage means, and means for preventing the pivot valve from moving by fluctuation of the fluid pressure in the pressure chamber regardless of the electromagnetic force generated by the electromagnetic means.

BRIEF DESCRIPTION OF THE DRAWINGS

Additional objects and advantages of the present invention will become more apparent from the following detailed description of preferred embodiments thereof when considered with reference to the attached drawings, in which:

FIG. 2 shows a cross-sectional view of a second embodiment of an electromagnetic proportional pressure control valve in accordance with the present invention.

DESCRIPTION OF THE PREFERRED EMBODIMENTS

Figure 1:
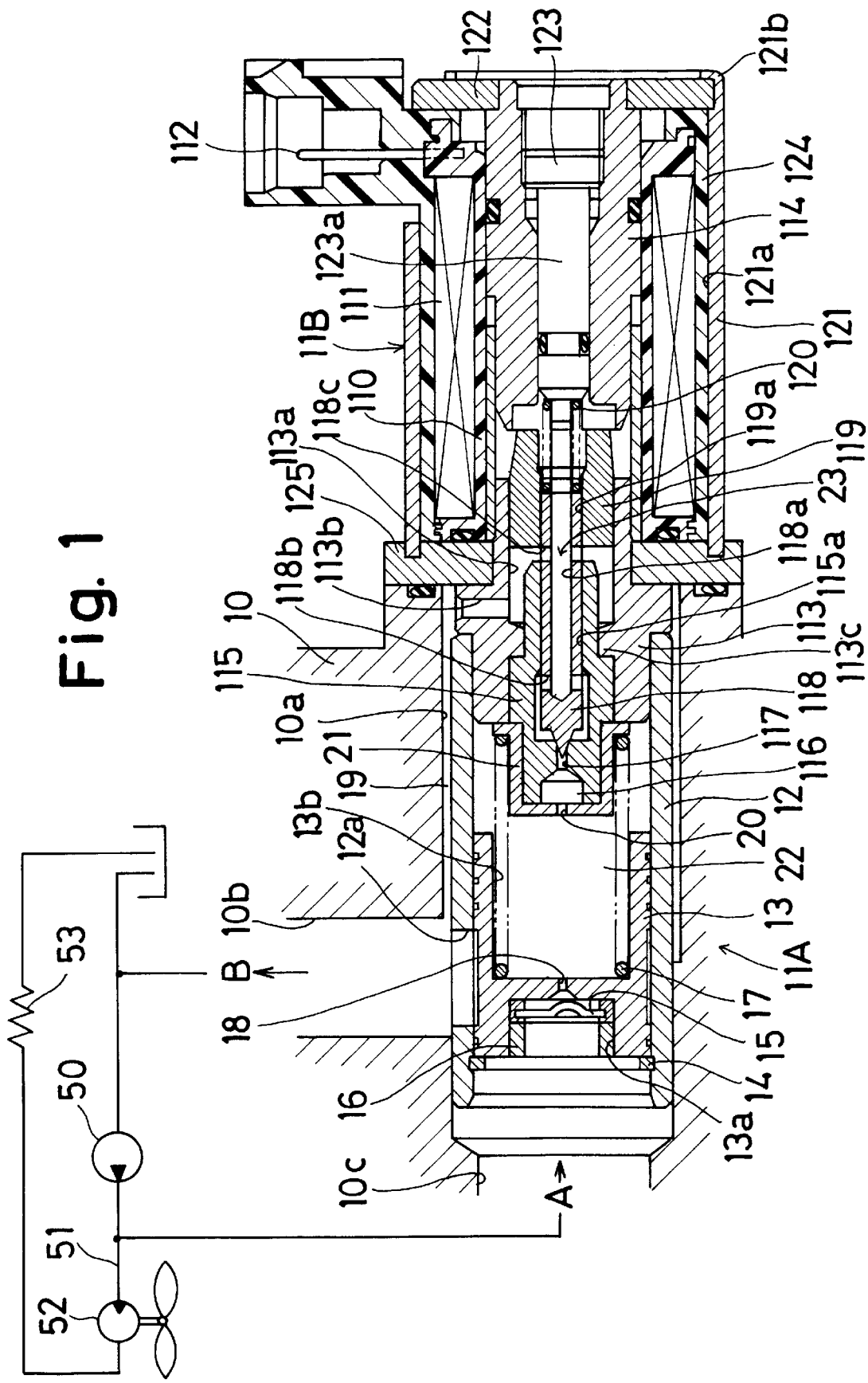
FIG. 1 shows a cross-sectional view of a first embodiment of an electromagnetic proportional pressure control valve in accordance with the present invention.

An electromagnetic proportional pressure control valve in accordance with preferred embodiments of the present invention will be described with reference to the attached drawings.

FIG. 1 shows a first embodiment of the present invention. Referring to FIG. 1, an electromagnetic proportional pressure control valve comprises a control valve section 11A and an electromagnetic field section 11B which are assembled together as one unit. The electromagnetic proportional pressure control valve has a housing 10 having an inlet port 16 leading to a discharge side of an oil pump 50 through a line A and an outlet port 18 leading to a suction side of the oil pump 50 through a line B. Numeral 52 is an oil motor for selectively driving a fan and numeral 51 is a discharge line of the oil pump 50.

The housing 10 has a cylindrical bore 10a into which the inlet port 10c and the outlet port 10b open. A hollow sleeve 12 is housed in the cylindrical bore 10a and an oil return passage 19 is formed between the outer surface of the sleeve 12 and the inner surface of the cylindrical bore 10a. The sleeve 12 has an outlet hole 12a opening the outlet port 10b and a spool 13 is slidably accommodated in the sleeve 12. The spool 13 is provided with a stepped bore having a first bore 13a and a second bore 13b and a wall portion is formed between the first and second bores 13a, 13b. A first orifice 18 for communicating between the first and second bores 13a, 13b and corresponding to a restricting means of the present invention is formed on the wall portion of the spool 13. A filter 15 is disposed in the first bore 13a which is located at the side of the inlet port 10c. Numeral 14 denotes a ring for limiting a displaceable range of the spool 13 and numeral 16 is a filter supporting element. The spool 13 is normally urged by a coil return spring 17 in one direction so that the left side of the spool 13 contacts with the ring 14 in FIG. 1.

Plunger means 23 is provided at the other side of the cylindrical bore 10a, which includes a plunger 119 made of magnetic material and having a central bore 119a, a pilot valve 118 press fitted into the central bore 119a of the plunger 119 and having a central passage 118a therein, a first core 113 fixed on the sleeve 12 and having a central bore 113a and a hole 113b which communicates between the return passage 19 and the central bore 113a, and a valve seat member 115 fixed to the first core 113 and having a central bore 115a and a return hole 117 which is opened and closed by the pilot valve 118 urged by a spring 120. The first core 113 is made of magnetic material. The pilot valve 118 is slidably housed in the central bore 115a of the valve seat member 115 and the valve seat member 115 is provided with radial holes 118b which can communicate the central passage 118a with the return hole 117 and radial holes 118c which communicates the central passage 118a with the central bore 113a of the first core 113. Numeral 113c is a stepped portion which is formed on the central bore 113a of the first core 113 for positioning the valve seat member 115 relative to the first core 115.

In an interior space formed in the sleeve 12, a pressure chamber 22 is defined by the spool 13, the first core 113 and the valve seat member 115. The pressure chamber 22 communicates with the inlet port 10c through the first orifice 18. The valve seat member 115 is provided with a projecting portion which projects into the pressure chamber 115. The projecting portion has an inner bore to define an absorbing chamber 116 having a predetermined volume whose one end is connected to the return hole 117 and whose other end is opens into the pressure chamber 22. A cylindrical cap member 21 having a bottom portion at its one end is fixed on the projecting portion of the valve seat member 115. A second orifice 20 through which the pressure chamber 22 and the absorbing chamber 116 communicate is formed on the bottom portion of the cap member 21. The cap member 21 is provided with an outer flange at its the other end and one end of the return spring 17 is engaged with the outer flange of the cap member 21. Now, the second orifice 20 and the absorbing chamber 116 correspond to means for preventing the pivot valve from moving by fluctuation of the fluid pressure in the pressure chamber.

An electromagnetic coil 23 is wound around a hollow bobbin 110 made of resin and is connected to a terminal 112. The first core 113 is fitted into one end of an inner bore of the bobbin 110 and a second core 114 having a bore is fitted into the other end of the inner bore of the bobbin 110. A body 124 made of resin and supporting the terminal 112 covers the bobbin 110. A plate 125 fixed to the first core 113 and made of magnetic material is interposed between the housing 10 and the bobbin 110. A cylindrical yoke member 121 which has a bore 121a and whose one end is connected to the plate is fitted on the outer circumferential portion of the body 124. The other end 121b of the yoke member 121 is fixed to a plate 122 made of magnetic material by caulking. The plate 122 is fitted on one end of the second core 114 and thereby the bobbin 110 is held between the plates 122 and 125. An adjusting screw member 123 is screwed into the bore of the second core 114 and a rod portion 123a of the adjusting screw member 123 is slidably fitted into the bore of the second core 114. The top end of the rod portion 123a of the adjusting screw member 123 is engaged with one end of the spring 120 which urges the pilot valve 118 so as to close the return hole 117.

When the electric current is not supplied to the electromagnetic coil 111, the pilot valve 118 closes the return hole 117. Therefore, since the pressure difference between the inlet port 10c and the pressure chamber 22 is not generated, the spool 13 is in the position at which the fluid communication between the inlet port 10c and the outlet port 10b through the outlet hole 12a is not allowed.

When the electric current is supplied to the electromagnetic coil 111, the electromagnetic circuit is formed about the electromagnetic coil 111 by the first core 113, the plunger 119, the second core 114, the plate 122, the yoke member 121 and the plate 125 and the electromagnetic force is produced to displace the pilot valve 28 toward the second core 114. Now, the supplied current is controlled by duty-control. When a sum of the electromagnetic force and the magnitude of the oil pressure in the pressure chamber 22 is less than the urging force of the spring 120, the return hole 117 is closed by the pilot valve 118. When the sum of the pressure in the pressure chamber 22 and the electromagnetic force becomes higher than the urging force of the spring 120, the pilot valve 118 is displaced rightward (in FIG. 1) to open the return hole 117 through the central passage 118a and a pressure difference is produced between the inlet port 10c and the pressure chamber 22 for the reason that an oil flow from the inlet port 10c into the pressure chamber 22 through the first orifice 18 is less than an oil flow from the pressure chamber 22 to the return passage 19. The pressure difference between the inlet port 10c and the pressure chamber 22 causes the spool 13 to move rightward (in FIG. 1) so that the inlet port 10c directly communicates with the outlet port 10b through the outlet hole 12a. As the result of the direct fluid communication between the inlet port 10c and the outlet port 10b, the pressure in the inlet port is reduced and this pressure difference is diminished. When the pressure in the pressure chamber 22 is decreased, the pilot valve 28 is displaced leftward (in FIG. 1) by the urging force of the spring 31 to close the return hole 117 and the spool 13 is moved leftward (in FIG. 1) by the pressure in the pressure chamber 22 and the return spring 120 to cut off the direct fluid communication between the inlet port 10c and the outlet port 10b. Thus, the pressure of the working oil discharged from the oil pump 50 is linearly controlled in response to the variation of the temperature of water in a radiator 53.

It is noted that a pressure receiving area of the pilot valve 118 is considerably smaller than that of the spool 13 and hence an attractive force produced by the small magnitude of electrical current enables the pilot valve 118 to move. Further, the fluid communication between both the ports 10c, 10b is gradually established so that a hunting of the spool 13 is prevented.

The pulsation of the working oil discharged from the oil pump 50 is transmitted to the inlet port 11c. This pulsation is relieved by the first orifice 18 to some degree, but the pulsation is transmitted to the pressure chamber 22. In this embodiment, the return hole 117 communicates with the pressure chamber 22 through the second orifice 20 and the absorbing chamber 116. Thereby, the pulsation is relieved by the second orifice 20 and the absorbing chamber 116 and the pilot valve 118 is prevented from moving by fluctuation of the fluid pressure in the pressure chamber 22 due to the pulsation regardless of the electromagnetic force. Furthermore, in this embodiment, since the urging force of the return spring 120 can be adjusted by the rotation of the adjusting screw member 123, it is able to the maximum value of the pressure of the working oil discharged from the oil pump 50.

FIG. 2 shows a second embodiment of the present invention. In FIG. 2, the same parts as compared with FIG. 1 are identified by the same reference numerals. Referring to FIG. 2, the adjusting screw member 123 is provided with an axial bore 123b. One end of a pin 126 is press fitted into the right end of the central passage 118a (in FIG. 2) and the other end of the pin 126 is slidably fitted into the axial bore 123b so that a damping chamber 127 is formed in the axial bore 123b.

In this embodiment, the pulsation of the working oil which is relieved by the first orifice 18 to some degree acts on the pilot valve 118 through the return hole 17. Thereby, an axial force is acted on the pilot valve 118 so that the pilot valve 118 is rightwardly moved against the urging force of the spring 120. At this time, since the oil filled in the damping chamber 127 is restricted by the sliding clearance between the axial bore 123b and the pin 126, the flow resistance is generated and the pilot valve 118 is prevented from moving by fluctuation of the fluid pressure in the pressure chamber 22 due to the pulsation regardless of the electromagnetic force.

The principles, preferred embodiments and modes of operation of the present invention have been described in the foregoing description. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An electromagnetic pressure control valve comprising:

a housing having at least one fluid inlet port and fluid outlet port;

a spool slidably accommodated in the housing for opening and closing a passage between the fluid inlet port and the fluid outlet port;

plunger means having a pilot valve, the plunger means being housed in the housing and defining a first pressure chamber together with the spool;

return passage means that is arranged through the plunger means between the first pressure chamber and the fluid outlet port, and whose opening and closing is controlled by the pilot valve;

first flow restricting means for restricting the quantity of flow between the fluid inlet port and the first pressure chamber;

electromagnetic means for actuating the pilot valve so as to control the opening and closing of the return passage means; and a second pressure chamber operatively connected with the pilot valve for absorbing fluctuations of the fluid pressure in the first pressure chamber.

2. An electromagnetic pressure control valve as recited in claim 1, wherein an orifice is defined between the first pressure chamber and the second pressure chamber.

3. An electromagnetic pressure control valve as recited in claim 1, wherein the volume of the second pressure chamber is varied in response to the movement of the pilot valve and the second pressure chamber is communicated to the fluid outlet port via a restricted passage.

* * * * *